(12) United States Patent
Parker et al.

(10) Patent No.: US 9,718,382 B2
(45) Date of Patent: Aug. 1, 2017

(54) SEAT SUSPENSION

(71) Applicant: Bose Corporation, Framingham, MA (US)

(72) Inventors: Robert Preston Parker, Westborough, MA (US); Steven N. Brown, Cambridge, MA (US)

(73) Assignee: Bose Corporation, Framingham, MA (US)

( * ) Notice: Subject to any disclaimer, the term of this patent is extended or adjusted under 35 U.S.C. 154(b) by 99 days.

(21) Appl. No.: 14/504,525

(22) Filed: Oct. 2, 2014

(65) Prior Publication Data

US 2016/0096458 A1    Apr. 7, 2016

(51) Int. Cl.
| | | |
|---|---|---|
| *A47C 1/033* | (2006.01) |
| *B60N 2/50* | (2006.01) |
| *B60N 2/10* | (2006.01) |
| *B60N 2/16* | (2006.01) |

(52) U.S. Cl.
CPC .............. *B60N 2/505* (2013.01); *B60N 2/10* (2013.01); *B60N 2/16* (2013.01); *B60N 2/508* (2013.01)

(58) Field of Classification Search
CPC .......... B60N 2/505; B60N 2/508; B60N 2/10; B60N 2/162; B60N 2/1625
USPC .............. 297/313, 337, 321, 344.15, 344.16, 297/344.17; 248/421, 423
See application file for complete search history.

(56) References Cited

U.S. PATENT DOCUMENTS

| | | | |
|---|---|---|---|
| 2,954,071 A | | 9/1960 | Morrison et al. |
| 2,998,054 A | | 8/1961 | Radke et al. |
| 3,123,400 A | * | 3/1964 | Paulson ............... A61G 7/1003 297/344.16 X |
| 3,356,413 A | * | 12/1967 | Radke .................... B60N 2/045 248/567 |
| 3,567,279 A | * | 3/1971 | Hall et al. .............. B60N 2/504 297/309 |
| 3,711,149 A | * | 1/1973 | Carter .................... B60N 2/501 248/584 |

(Continued)

FOREIGN PATENT DOCUMENTS

| | | |
|---|---|---|
| CA | 1154663 | 10/1983 |
| EP | 0015707 B1 | 9/1983 |

(Continued)

*Primary Examiner* — Rodney B White
(74) *Attorney, Agent, or Firm* — Brian M. Dingman; Dingman IP Law, PC

(57) ABSTRACT

A seat support mechanism that is adapted to constrain motion of a bottom of a seat relative to a floor as the seat bottom moves up and down relative to the floor, where the seat has a seat back, and where the seat is constructed and arranged to support an occupant thereof above the floor, wherein the seat bottom has a front edge, and wherein the seat bottom supports the occupant's thighs with the knees in front of the front edge of the seat bottom. The seat support mechanism is constructed and arranged such that as the seat bottom is moved up and down, the seat support mechanism causes the seat bottom to pivot about a virtual lateral horizontal pivot axis located farther from the front edge of the seat bottom than the occupant's knees. The seat support mechanism is further constructed and arranged such that the back of the seat remains at a relatively constant angle to the floor as the seat bottom moves up and down and pivots.

17 Claims, 5 Drawing Sheets

(56) References Cited

U.S. PATENT DOCUMENTS

| | | | |
|---|---|---|---|
| 3,788,697 A * | 1/1974 | Barton | B60N 2/502 248/585 |
| 3,851,917 A * | 12/1974 | Horstmann | A61G 5/14 297/344.15 |
| 4,074,886 A * | 2/1978 | Yates | B60N 2/1803 248/394 |
| 4,494,794 A * | 1/1985 | Barley | B60N 2/502 297/307 |
| 4,561,621 A | 12/1985 | Hill | |
| 4,828,216 A | 5/1989 | Van Duser | |
| 4,846,529 A | 7/1989 | Tulley | |
| 4,854,641 A * | 8/1989 | Reineman | A47C 1/03255 297/344.15 X |
| 4,880,201 A * | 11/1989 | Hall | B60N 2/502 248/421 |
| 4,949,930 A | 8/1990 | Van Duser | |
| 5,154,402 A * | 10/1992 | Hill | B60N 2/502 248/429 |
| 5,253,922 A * | 10/1993 | Corlett | A47C 3/20 297/344.16 X |
| 5,542,638 A * | 8/1996 | Smith | B60N 2/502 297/344.16 X |
| 5,651,585 A * | 7/1997 | Van Duser | B60N 2/502 248/585 |
| 5,927,679 A * | 7/1999 | Hill | B60N 2/502 248/421 |
| 5,950,977 A * | 9/1999 | Proksch | B60N 2/502 108/145 |
| 5,984,411 A * | 11/1999 | Galumbeck | A61G 5/14 297/344.15 X |
| 6,155,642 A * | 12/2000 | Kawakami | A47C 1/06 297/344.16 X |
| 6,264,163 B1 * | 7/2001 | Ivarsson | B60N 2/501 248/550 |
| 6,398,303 B1 | 6/2002 | Herrmann et al. | |
| 6,783,179 B2 * | 8/2004 | Komura | A61G 5/14 297/344.17 X |
| 6,866,236 B2 * | 3/2005 | Mullinix | B60N 2/501 248/421 |
| 7,971,936 B2 * | 7/2011 | Fukai | A47C 1/032 297/321 X |
| 8,303,037 B2 * | 11/2012 | Weber | B60N 2/1867 297/344.15 |
| 8,414,054 B2 | 4/2013 | Komatsubara et al. | |
| 8,548,678 B2 * | 10/2013 | Ummethala | B60N 2/501 267/140.15 |
| 8,641,141 B2 * | 2/2014 | Hassler | B60N 2/0705 297/216.1 |
| 8,844,894 B2 * | 9/2014 | Archambault | B60N 2/508 248/421 |
| 8,944,507 B2 * | 2/2015 | Goetz | A47C 7/022 297/321 |
| 9,492,339 B2 * | 11/2016 | Leib | A61G 5/14 |
| 2003/0151288 A1 * | 8/2003 | Deisig | A47C 3/20 297/313 |
| 2010/0207354 A1 * | 8/2010 | Hunziker | A61G 5/14 280/304.1 |
| 2012/0169099 A1 * | 7/2012 | Horiguchi | B60N 2/0232 297/314 |

FOREIGN PATENT DOCUMENTS

| | | |
|---|---|---|
| EP | 2088028 B1 | 7/2011 |
| JP | 06316233 A * | 11/1994 |
| KR | 1019960082448 | 12/2000 |

* cited by examiner

SEAT SUSPENSION

BACKGROUND

This disclosure relates to seat suspension.

Active suspension systems for motor vehicle seats move the seat up and down relative to the floor in order to reduce road-induced vibration in the seat. As the seat is raised from its nominal center height, the distance from the seat to floor-mounted control pedals changes. This can cause uncomfortable pressure on the back of the user's thighs, and when the excursion is large enough, eventual loss of contact of the driver's feet with the pedals.

U.S. Pat. No. 4,494,794 relates to an active vehicle seat suspension system which aims to prevent loss of contact between the feet of the seat occupant and control pedals of the vehicle. The system includes linkages that connect the seat to the base and which are used to control forward/backward and tilting motions of the seat bottom as the seat moves up and down relative to the floor. The system causes the occupant's ankles to remain stationary whereas his knees swing about an axis through his ankles.

SUMMARY

In U.S. Pat. No. 4,494,794, as the seat is moved up and down relative to the floor the seat bottom tilts relative to the floor and relative to the seat back, and the seat is translated fore and aft. The combination of tilting and translation moves the knee in a circular arc around the ankle, which inhibits loss of contact between the foot and the control pedals. However, the tilting of the seat bottom relative to the seat back can be uncomfortable because of the varying angle at the waist. Also, the seat translation fore and aft while the vehicle is in motion can be disconcerting to some drivers.

In the disclosed seat suspension, a seat support mechanism constrains motion of the seat as the seat is moved up and down. The seat support mechanism is adapted to pivot the seat bottom about a horizontal axis as the seat bottom moves up and down, while at the same time reducing the variation in the angle between the seat bottom and seat as compared to that in U.S. Pat. No. 4,494,794. A result is that the user is more comfortable as the seat is tilted as compared to the seat in U.S. Pat. No. 4,494,794.

All examples and features mentioned below can be combined in any technically possible way.

In one aspect, a seat support mechanism is adapted to constrain motion of a bottom of a seat relative to a floor as the seat bottom moves up and down relative to the floor, where the seat has a seat back, and where the seat is constructed and arranged to support an occupant thereof above the floor, wherein the seat bottom has a front edge, and wherein the seat bottom supports the occupant's thighs with the knees in front of the front edge of the seat bottom. There is mechanical structure that is constructed and arranged such that as the seat bottom is moved up and down, the seat bottom is caused to pivot about a virtual lateral horizontal pivot axis located farther from the front edge of the seat bottom than the occupant's knees. The seat support mechanism is further constructed and arranged such that the back of the seat remains at a relatively constant angle to the floor as the seat bottom moves up and down and pivots.

Examples may include one of the following features, or any combination thereof. The location of the virtual pivot axis may remain relatively fixed as the seat bottom is moved up and down. The seat support mechanism may further comprise structure that allows the location of the virtual pivot axis to be varied. The structure that allows the location of the virtual lateral pivot axis to be varied may comprise a seat bottom support member that is coupled to the seat bottom at an adjustable angle. The seat support mechanism may further comprise a first pivoting structural member below the seat bottom and that has a bearing surface to which the seat bottom support member is coupled. The bearing surface may be curved. The lower end of the seat bottom support member may be coupled to the curved bearing surface at a coupling location, and the curved bearing surface may be an arc with a radius of curvature approximately equal to the length of the seat bottom support member. The coupling location may be adjustable. The coupling location adjustment may be accomplished with an arm that is pivotably coupled to the first pivoting structural member and extends over the curved bearing surface, where the seat bottom support member is pivotably connectable to the arm at different locations along the arm.

Examples may alternatively include one of the following features, or any combination thereof. The seat may face in a seat facing direction, and the virtual pivot axis may be horizontal and perpendicular to the seat facing direction. The mechanical structure may further comprise a second pivoting structural member with a first end that is at a fixed height above the floor, and a second end, where the first end is adapted to pivot about a first horizontal axis so as to alter the height of the second end relative to the floor, wherein the two pivoting structural members are coupled together at a pivot location and are each adapted to pivot about a horizontal axis. The seat support mechanism may further comprise a seat back support member, wherein the first pivoting structural member is indirectly connected to the seat back support member by a link that is pivotably coupled to both the first pivoting structural member and the seat back support member. All of the pivot axes may be horizontal and perpendicular to the seat facing direction.

Examples may alternatively include one of the following features, or any combination thereof. The seat bottom may be generally horizontal at a nominal center height and the seat support mechanism may cause the front of the seat to tilt downward as the seat is moved above the nominal center height. The seat support mechanism may cause the seat tilt angle to vary approximately linearly as a function of height. Alternatively, the seat support mechanism may cause the seat tilt angle to vary non-linearly as a function of height. The seat support mechanism may cause the seat to tilt more as it is moved above the nominal center height than the seat is caused to tilt as it is moved below the nominal center height. The seat support mechanism may comprise a cam and cam follower that together cause the seat tilt angle to vary non-linearly as a function of height.

In another aspect a seat support mechanism is adapted to constrain motion of a bottom of a seat relative to a floor as the seat bottom moves up and down relative to the floor, where the seat has a seat back, and where the seat is constructed and arranged to support an occupant thereof above the floor, wherein the seat bottom has a front edge, and wherein the seat bottom supports the occupant's thighs with the knees in front of the front edge of the seat bottom. There is mechanical structure that is constructed and arranged such that as the seat bottom is moved up and down, the seat bottom is caused to pivot about a virtual lateral horizontal pivot axis located farther from the front edge of the seat bottom than the occupant's knees. There is structure that allows the location of the virtual pivot axis to be varied. The seat faces in a facing direction, and the virtual pivot axis is perpendicular to the seat facing direction. The seat support mechanism is further constructed and arranged such that the back of the seat remains at a relatively constant angle to the floor as the seat bottom moves up and down and pivots.

Examples may include one of the following features, or any combination thereof. The mechanical structure that allows the location of the virtual pivot axis to be varied may comprise a seat bottom support member that is coupled to the seat bottom at an adjustable angle; a first pivoting structural member below the seat bottom and that has a curved bearing surface to which the seat bottom support member is coupled, wherein the lower end of the seat bottom support member is coupled to the curved bearing surface at an adjustable coupling location, and wherein the curved bearing surface is an arc with a radius of curvature approximately equal to the length of the seat bottom support member; wherein the coupling location adjustment is accomplished with an arm that is pivotably coupled to the first pivoting structural member and extends over the curved bearing surface, where the seat bottom support member is pivotably connectable to the arm at different locations along the arm.

In another aspect, a method of constraining motion of a bottom of a seat relative to a floor as the seat bottom moves up and down relative to the floor, where the seat has a seat back, and where the seat is constructed and arranged to support an occupant thereof above the floor, wherein the seat bottom has a front edge, and wherein the seat bottom supports the occupant's thighs with the knees in front of the front edge of the seat bottom, includes, as the seat bottom is moved up and down, causing the seat bottom to pivot about a virtual lateral horizontal pivot axis located farther from the front edge of the seat bottom than the occupant's knees, while maintaining the back of the seat at a relatively constant angle to the floor.

DETAILED DESCRIPTION

Some active suspension systems for motor vehicle seats have a seat bottom that remains at a fixed angle as the seat is moved up: the increased distance between the knee and the foot pedals as the seat is raised can lead to variation in foot pedal force. The seat suspension system in U.S. Pat. No. 4,494,794 tilts the seat bottom to an extent that, together with movement of the seat fore and aft, the knee is moved in an arc relative to the ankle. This eliminates the propensity for variation in foot pedal force as the seat is moved up and down, but at the expense of relatively large variation in the angle at the waist, which can be uncomfortable. The present seat support mechanism does not translate the seat fore and aft, and tilts the seat at less of an angle as compared to that of U.S. Pat. No. 4,494,794. A result is that foot pedal force variation is reduced as compared to that in fixed angle seats, while waist angle variation is reduced as compared to that of U.S. Pat. No. 4,494,794.

Figure 1:
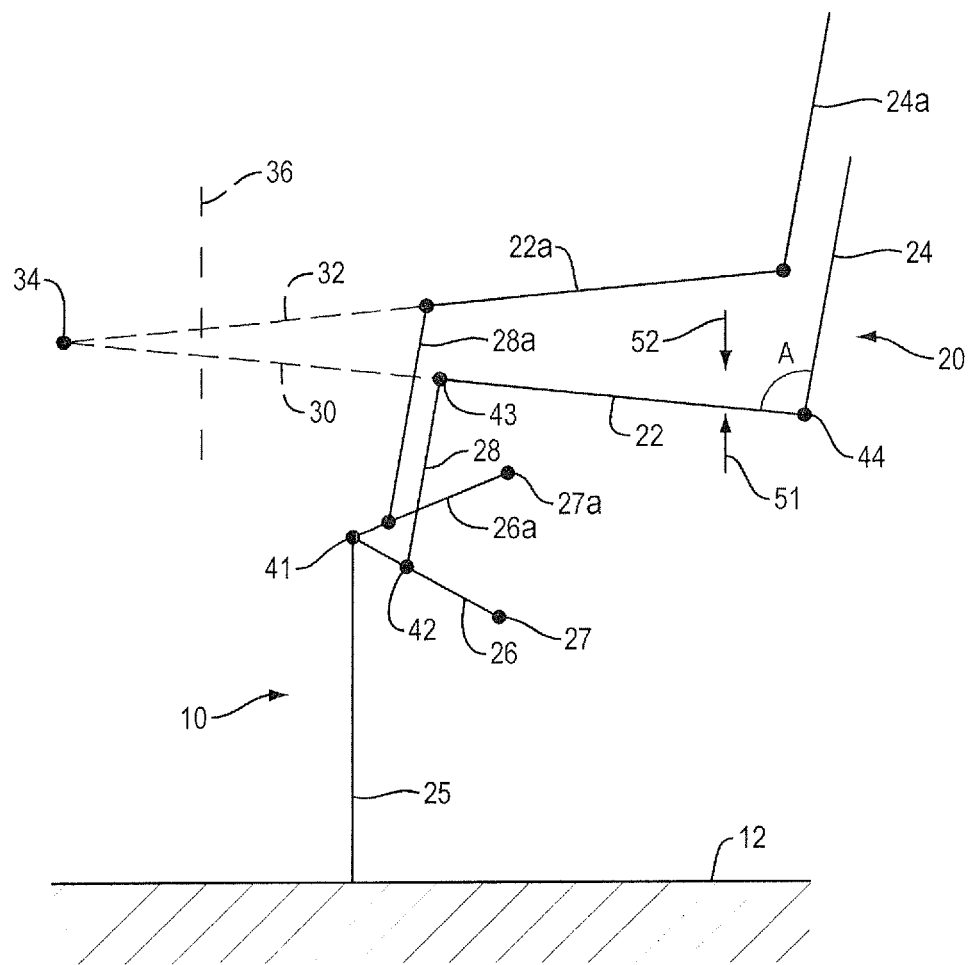
FIG. 1 is highly schematic diagram of a seat and a seat support mechanism.

FIG. 1 is a stick figure diagram of a seat support mechanism 10. Seat support mechanism 10 is adapted to constrain motion of the seat bottom 22 as seat bottom 22 is moved up and down relative to the floor 12. Seat support mechanism 10 has a first link 26 with a first end 41 that is at a fixed height above the floor by virtue of fixed support 25, and a second end 27. The first end 41 is adapted to pivot about a first horizontal axis (which in the drawing is coincident with end 41, with the axis orthogonal to the plane of the drawing). As seat bottom 22 and seat back 24 are moved up and down, the second end 27 of link 26 moves up and down the same amount as the seat back. The location of point 42 on link 26 will affect the motion of seat bottom 22. There is a second link 28 that couples the first link 26 to the seat bottom 22. The second link 28 is adapted to pivot about upper 43 and lower 42 horizontal axes of link 28 relative to both the seat bottom 22 and the first link 26.

Seat support mechanism 10 is adapted to pivot the seat bottom 22 about a lateral horizontal virtual pivot axis 34 (axis 34 being perpendicular to the plane of the page in FIG. 1) as the seat bottom 22 is moved up and down. In the drawing, seat bottom 22 lies along lower longitudinal axis 30 at the lower limit of travel of the seat while the seat's upper limit of travel is indicated by seat bottom 22a lying along upper longitudinal axis 32. Seat bottom 22 pivots about virtual horizontal pivot axis 34 as it is moved up and down. The back 24 of the seat 20 is adapted to tilt about horizontal pivot axis 44 relative to the seat bottom 22 as the seat bottom moves up and down and pivots about axis 34. This pivot allows the angle of the seat back 24 relative to the floor to remain relatively constant as the seat moves up and down. In order to accommodate the fixed angle back as the tilt of the seat changes, angle "A" between seat bottom 22 and seat back 24 will change as seat bottom 22 pivots about virtual pivot axis 34. The arrangement of the links in the seat suspension constrains motion of the seat such that the seat bottom follows a path in space that can be characterized by a pivoting about a virtual pivot axis. The virtual pivot axis is located farther from the seat than the user's knees and at about knee height. A result is that the seat bottom can be pivoted about the virtual pivot axis without needing to translate the seat fore and aft. The virtual pivot axis may be fixed, or may move as the seat is moved up and down, as is further explained below.

The means by which the seat is moved up and down are not shown in FIG. 1, but are indicated by arrows 51 and 52. Typically but not necessarily the seat suspension is used in an actively suspended seat such as that disclosed in U.S. Pat. No. 8,548,678, the disclosure of which is incorporated herein by reference. Actively suspended seats have an actuator system that is able to generate forces whose magnitude and direction can be controlled independently of the position and motion of the suspension. The actuator system is used to inhibit or prevent motions of the chassis (represented in FIG. 1 by floor 12) from being transmitted to the seat. Thus an actuator system can decrease or remove seat vibration. One non-limiting example of an actuator system includes a bias force eliminator such as an air cylinder coupled with an electromagnetic actuator (e.g., either a linear actuator or a rotary actuator).

Figure 2:
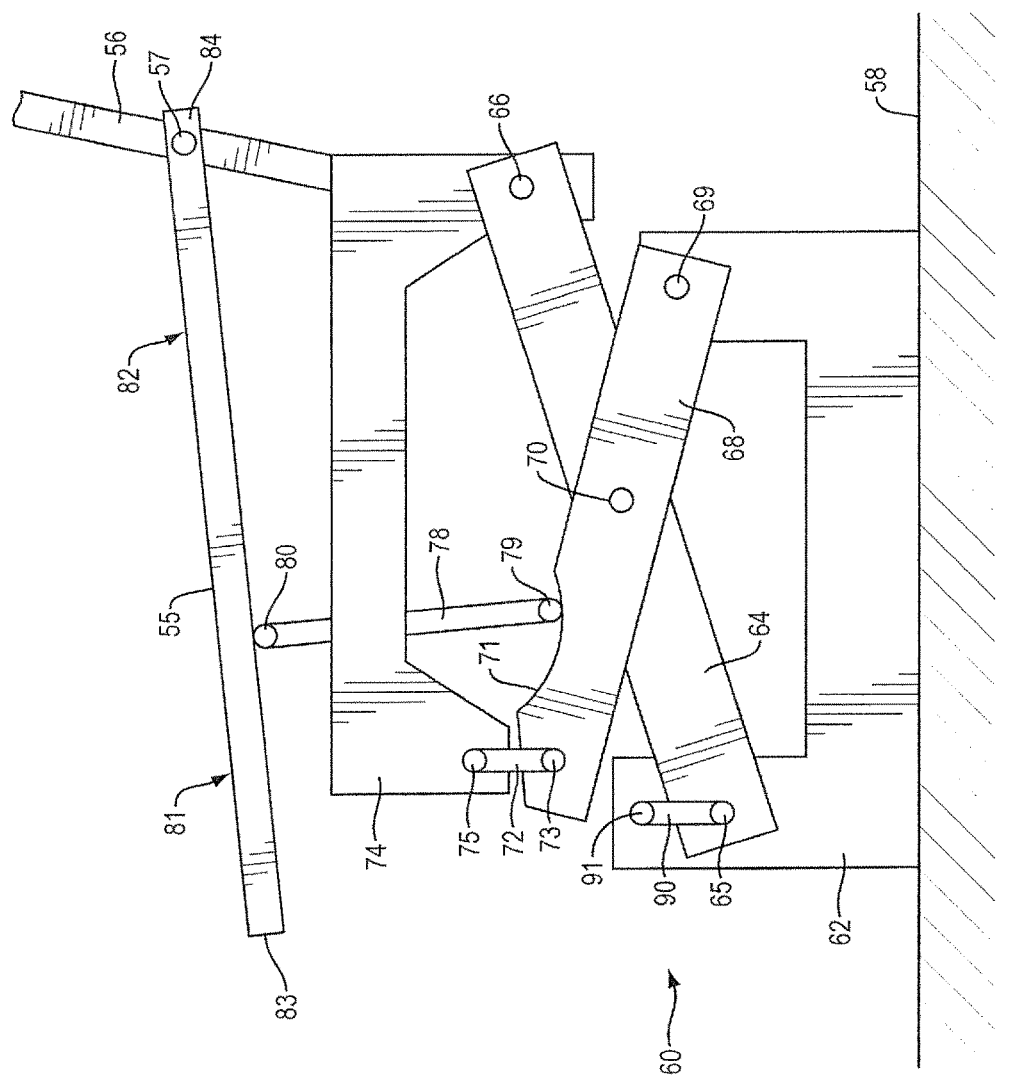
FIG. 2 is schematic diagram of a seat and a seat support mechanism.

FIG. 2 illustrates one example of a seat support mechanism 60 that is adapted to constrain motion of seat bottom 55 relative to floor 58 as seat bottom 55 moves up and down. In a typical seat arrangement there would be two of the scissor mechanisms and link arrangements shown in FIG. 2, one on each side of the seat. Only one is shown here for clarity. FIG. 2 depicts the seat at or close to its upper range of motion. Fixed support member 62 is coupled to floor 58 and provides pivoting anchor points for first link or structural member 68 and a sixth link 90 (which has pivot ends 65 and 91); end 65 moves mostly fore-and-aft as the seat is moved up and down. This frees member 64 to move without being overconstrained. Links 64 and 68 form a scissors mechanism via mutual pivot 70. Link 68 pivots about lower horizontal pivot axis 69, which raises and lowers upper pivot axis 73. Fourth link 72 couples link 68 to third link (seat back support member) 74. Seat back 56 is carried by link 74, which does not rotate appreciably. Seat bottom 55 is able to pivot about horizontal axis 57. Link 72 is able to pivot about horizontal pivot axes 73 and 75. Seat bottom 55 has rear portion 82, rear edge 84, front portion 81 and front edge 83. Link 64 pivots relative to link 74 about upper horizontal pivot axis 66, and is constrained vertically by link 90. As with FIG. 1, the means by which the seat is moved up and down are not depicted in FIG. 2, simply for the sake of clarity.

Second link (seat bottom support member) 78 has lower pivoting end 79 which rests on curved bearing surface 71 of link 68. End 79 does not move along bearing surface 71 as the seat is moved up and down. Bearing surface 71 need not take this shape and need not be curved. The bearing surface is described in more detail below. Link 78 has upper pivoting end 80 which is coupled to seat bottom 55 and supports seat bottom 55; preferably member 78 is coupled to seat bottom 55 somewhere within the seat bottom front portion 81, as shown.

Preferably, but not necessarily, end 79 can be moved along surface 71, to change the amount of tilt of seat bottom 55 in response to a given amount of vertical travel. In the position shown, the forward tilt of the seat bottom is close to a maximum. If point 79 is moved all the way to the left end of surface 71 there will be little seat bottom tilt. This adjustability can be accomplished under user control. An example is described below. The connection at the bottom of link 78 need not be on a bearing surface, and need not be movable. For example, the connection could be made at a fixed location somewhere on link 68 that accomplished a desired amount of seat bottom tilt over the course of vertical travel. Likewise, the connection point 80 could be in a different location of the seat bottom, and/or it could be made adjustable in the manner of connection point 79 in FIG. 2.

Figure 3:
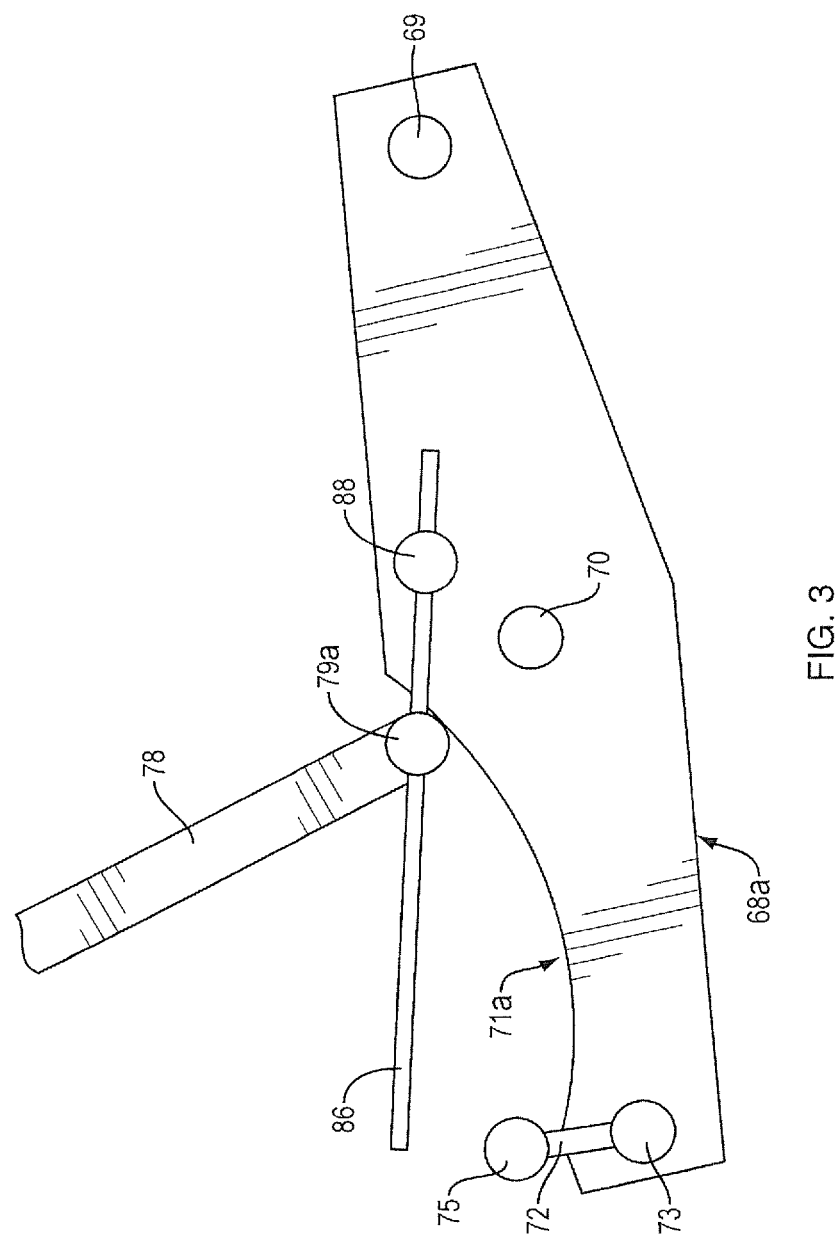
FIG. 3 illustrates portions of a seat support mechanism.

Seat support mechanism 60 is constructed and arranged to pivot seat bottom 55 about a virtual horizontal pivot location that sits in front of front edge 83, between the user's knees and infinity. The virtual pivot is at about knee height. The virtual horizontal pivot is a point in space which is fixed relative to both the seat bottom and the floor, for some incremental motion of the seat bottom. The actual location of this virtual pivot may change slightly as the seat moves up and down, but it remains between the knees of a person sitting on the seat and infinity. The virtual pivot axis is horizontal. It is also perpendicular to the seat facing direction, where the seat facing direction is defined as a horizontal axis in the normal forward driving direction of the motor vehicle. As the seat is moved down from the position shown in FIG. 2 the back edge 84 would move down more than the front edge 83, thus decreasing the amount of forward tilt, and toward the bottom of travel tilting the seat bottom backward such that the front edge is higher than the rear edge. At the same time, the fixed connection of back 56 to seat back support member/link 74 maintains back 56 at a relatively constant angle relative to floor 58. One result is that as the seat moves up the feet are less likely to pull off of floor-mounted pedals compared to seats in which the seat bottom angle relative to the floor is fixed. At the same time the torso remains at a constant angle relative to the floor. Since the virtual pivot axis of the seat bottom is in front of the knees, the variation of the tilt of the seat bottom is modest compared to that of the system disclosed in U.S. Pat. No. 4,497,794 where the seat bottom is tilted at greater angles so that the knee moves in a circular arc about the ankle. A result is less relative motion between the thighs and the torso, which makes a seat with the subject suspension more comfortable while still helping to keep the feet on the pedals, particularly toward the top of the range of vertical travel of the seat One non-limiting mechanism for allowing for adjustment of the location at which link 78 contacts bearing surface 71a of first link 68a, is depicted in FIG. 3. Arm 86 is coupled to link 68a at pivot connector 88. The distance by which arm 86 extends from connector 88 can if desired be made adjustable, for example by using a threaded rod for arm 86 and mating threads in connector 79a or 88, or left and right handed threads in arm 86 with mating threads in both connectors 79a and 88. Lower pivot end 79a of link 78 is supported by bearing surface 71a. Once this connection has been made the distance between points 88 and 79a is fixed. As end pivot 73 moves up and down, point 79a is moved up and down. If point 79a is moved out close to the end of arm 86 (i.e., to the left in the drawing), point 79a will sit at or close to the far left end of bearing surface 71a, which, as described above, decreases the extent of the tilting of the seat bottom. In the illustrative, non-limiting example depicted in FIG. 3, bearing surface 71a lies along a circular arc with a radius equal to the length of member 78, with the center being at pivot 80 (FIG. 2) with the seat at its mid-height position. With this design there would be no variation of tilt with respect to the length of the portion of arm 86 between points 79a and 88 when the seat is at mid height.

Figure 4:
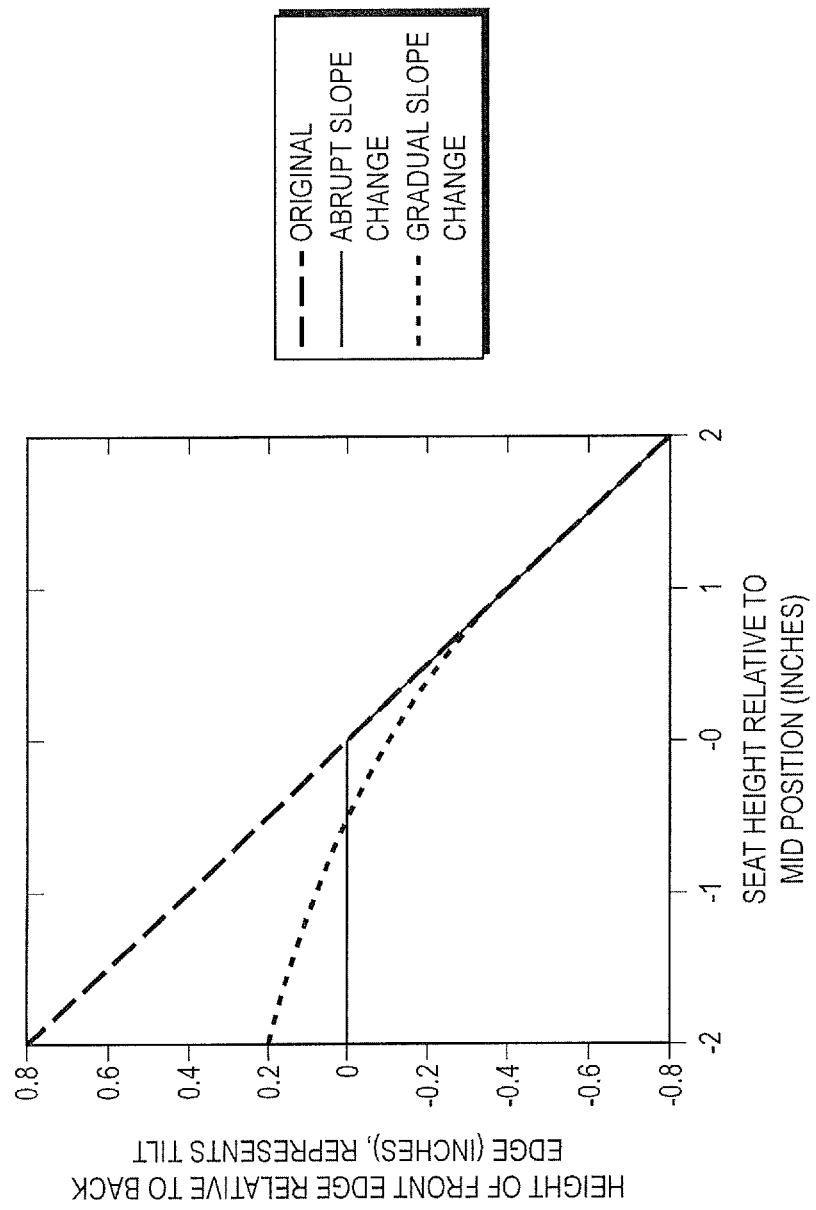
FIG. 4 illustrates seat bottom tilting for several examples of seat support mechanisms.

FIG. 4 illustrates seat bottom tilting for several examples of seat support mechanisms. This is a plot of seat tilt as the seat height changes from its lowest position (two inches below mid position) to highest position (two inches above mid position). Tilt is represented by the height difference between the front edge and rear edge.

The plot line labeled "original" is a conceptual approximation for seat support mechanism 60, FIG. 2, where tilt changes at a constant rate (or at least approximately constant rate such as can be accomplished with the mechanism shown in FIG. 2) as the seat is moved up and down. At the midpoint the seat is flat. For some adjustment of the length between points 79a and 88, at the upper extreme the seat is tilted down a maximum amount of 0.8 inches, while at the bottom of its travel the seat is tilted up 0.8 inches, for a total change in tilt of 1.6 inches over 4 inches of vertical travel. As the length between points 79a and 88 is changed, the slope of the linear "original" curve in FIG. 4 will change, while the curve will remain relatively straight and will always pass through the origin. The slope of the curve can be equated to a change in seat bottom tilt angle over the course of vertical travel of the seat. In one non-limiting example the tilt angle adjustment capability of a seat suspension allows the seat bottom tilt to be changed from a maximum of about +/−4 degrees to about +/−1 degree. In a more specific example the tilt angle change is about +/−2.5 degrees. At higher tilt angles, the virtual pivot moves closer to the knees, while at shallower angles the virtual pivot location is farther from the knees.

Tilting the seat bottom forward as it is raised from the midpoint helps to keep the driver's feet on the pedals, which can be helpful to safety and control. This also ameliorates the problem of too much pressure on the back of the thigh which can happen if the seat is raised without being tilted. However, tilting the seat 1.6 inches over its length of travel can cause enough flexing of the hips so as to be mildly uncomfortable to certain individuals. As described above, as the distance from point 79*a* to point 88 is increased the total change in tilt will decrease. Less tilting over the course of travel of the seat may help to ameliorate discomfort caused by tilting, but may be less effective in maintaining the feet on the pedals toward the upper part of travel of the seat.

The issue of the feet potentially lifting off of the pedals is greatest as the seat is moved up relative to the floor. In the lower region of travel (e.g., below the midpoint) there is little danger of the feet coming off the pedals, and pressure on the thighs shifts toward the hips, where humans are anatomically better at handling the load. Thus there is less reason to tilt the front of the seat upward as the seat moves down below its nominal height than there is to tilt the front of the seat downwards as the seat moves up above its nominal height. It can increase the user's comfort to forego (or at least decrease) upward tilting from around the midpoint height and below. Two of many possible examples of such changes from the constant rate in tilt change are depicted in FIG. 4 by the two lines labeled "abrupt slope change" and "gradual slope change." Abrupt slope change would keep the seat flat from the midpoint and below. Gradual slope change would decrease the rate of tilt change starting at about the midpoint, and below. In these cases the seat angle tilt varies approximately linearly with respect to height above the nominal center height, but below the nominal center height the tilt is either constant or varies less. When the seat tilt variation is smaller (or zero) in the bottom half of travel, over the entire travel range the seat tilt angle varies non-linearly as a function of height.

Figure 5:
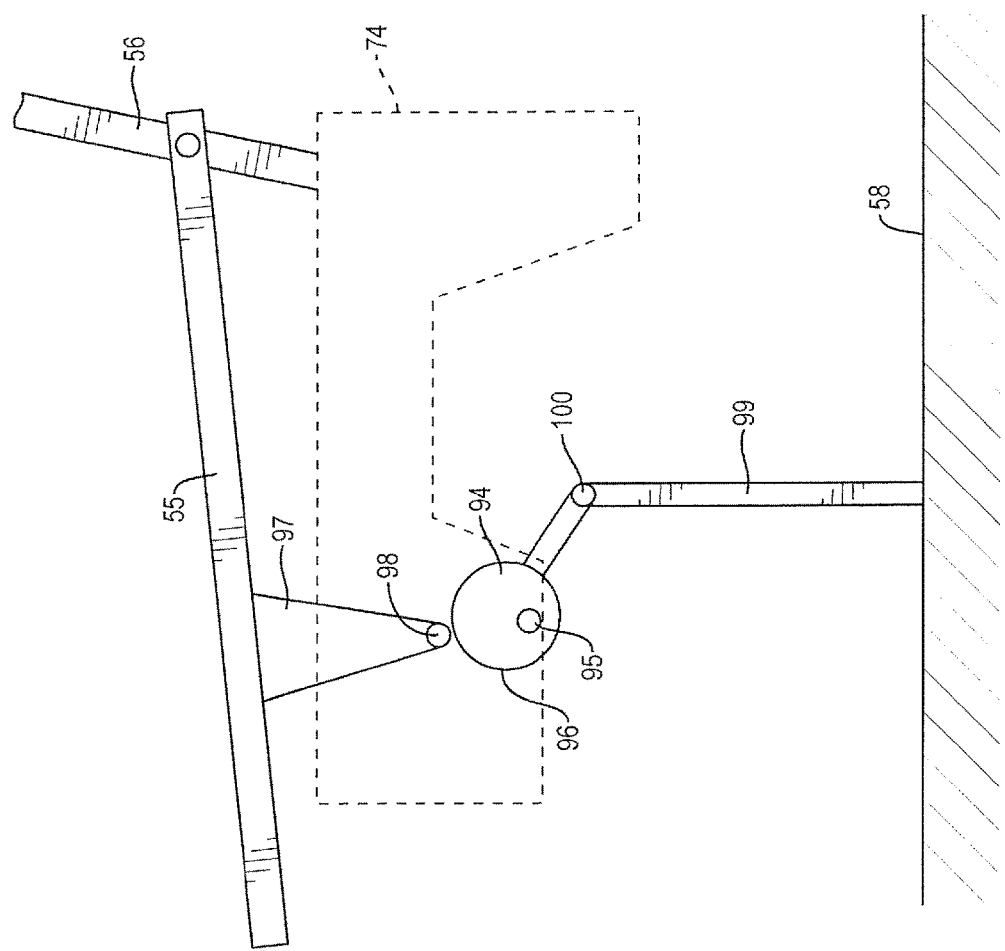
FIG. 5 illustrates portions of a seat support mechanism in which the amount of seat tilt can be varied.

FIG. 5 illustrates portions of a seat support mechanism in which the tilt of the seat can be a non-linear function of seat height. FIG. 5 thus illustrates an example of a seat support mechanism that is able to accomplish the "gradual slope change" curve of FIG. 4. Cam 94 is pivotably coupled at location 95 to link 74. Cam follower 98 is coupled to seat bottom 55 by support structure 97. Fixed support 99 is coupled to a structure that is fixed relative to the floor, which in this non-limiting example is floor 58, to define fixed height pivot coupling 100 between cam 94 and the floor. As seat bottom 55 is moved up and down, can follower 98 moves across part of the outer surface 96 of cam 94. The radius of cam 94 from its pivot 95 as a function of rotation determines the tilt of the seat as a function of seat height. Where the radius varies over the course of travel of the cam follower, the tilt will vary with seat height. Where the radius is constant, the tilt will be constant.

The subject seat suspension thus can implement linear or non-linear relationships between seat bottom position and tilt. There could be many variations. For example, it could be piecewise linear. There could be different regions where behavior is generally linear, but with different slopes in different regions. Other possibilities will be apparent to one skilled in the technical field. Most or all such variations could be accomplished by changing the profile of the cam described above. Other seat suspension structures that accomplish the described motions are also possible.

A number of implementations have been described. Nevertheless, it will be understood that additional modifications may be made without departing from the scope of the inventive concepts described herein, and, accordingly, other embodiments are within the scope of the following claims.

What is claimed is:

1. A seat support mechanism that is adapted to constrain motion of a bottom of a seat relative to a floor as the seat bottom moves up and down relative to the floor, where the seat has a seat back, and where the seat is constructed and arranged to support an occupant thereof above the floor, wherein the seat bottom has a front edge, and wherein the seat bottom supports the occupant's thighs with the knees in front of the front edge of the seat bottom, the seat support mechanism comprising:

mechanical structure that is constructed and arranged such that as the seat bottom is moved up and down, the seat bottom is caused to pivot about a virtual lateral horizontal pivot axis located in front of the front edge of the seat bottom, while the seat back remains at a relatively constant angle to the floor;

wherein the mechanical structure comprises:

a seat back support structure that mechanically supports the seat back;

a scissor mechanism mechanically coupled to the seat back support structure and the floor; wherein the scissor mechanism comprises first and second structural members; wherein the first structural member comprises a first end that is fixed in height relative to the floor and is arranged to pivot about a first pivot axis, and a second end that can move up and down relative to the floor and is pivotably coupled to the seat back support structure; and wherein the second structural member comprises a first end, and a second end that can move up and down relative to the floor and is pivotably coupled to the seat back support structure; and wherein the first and second structural members are pivotably coupled together at a location between their respective first and second ends; and a seat bottom support member with a first end that supports the seat bottom and a second end that is coupled to the scissor mechanism.

2. The seat support mechanism of claim 1 wherein the mechanical structure allows the location of the virtual pivot axis to be varied.

3. The seat support mechanism of claim 1 wherein the seat bottom support member is coupled to the seat bottom at an adjustable angle.

4. The seat support mechanism of claim 3 wherein the seat bottom support member is coupled to a curved bearing surface of the scissor mechanism.

5. The seat support mechanism of claim 4 wherein the second end of the seat bottom support member is coupled to the curved bearing surface at a coupling location, and wherein the curved bearing surface is an arc with a radius of curvature approximately equal to the length of the seat bottom support member.

6. The seat support mechanism of claim 1 wherein the seat faces in a seat facing direction, and wherein the virtual pivot axis is horizontal, and perpendicular to the seat facing direction.

7. The seat support mechanism of claim 1, wherein the second end of the first structural member of the scissor mechanism is indirectly connected to the seat back support structure by a link that is pivotably coupled to both the second end of the first structural member of the scissor mechanism and the seat back support structure.

8. The seat support mechanism of claim 7 wherein all of the pivot axes are horizontal and perpendicular to the seat facing direction.

9. The seat support mechanism of claim 1 wherein the seat bottom is generally horizontal at a first height, and the seat support mechanism causes the front of the seat to tilt downward as the seat is moved above the first height.

10. The seat support mechanism of claim 1 wherein the seat bottom is at an angle to the horizontal, and wherein the seat support mechanism is adapted to cause the angle of the seat bottom to the horizontal to vary linearly as a function of height from the floor.

11. The seat support mechanism of claim 1 wherein the seat bottom is at an angle to the horizontal, and wherein the seat support mechanism is adapted to cause the angle of the seat bottom to the horizontal to vary non-linearly as a function of height from the floor.

12. The seat support mechanism of claim 11 wherein the seat support mechanism is adapted to cause the seat bottom angle to the horizontal to change more as it is moved above the first height as compared to when it is moved below the first height.

13. The seat support mechanism of claim 1 wherein the seat bottom support member is pivotably coupled to the seat bottom, and is pivotably coupled to the scissor mechanism.

14. The seat support mechanism of claim 1 wherein the mechanical structure further comprises a fixed support member that is coupled to the floor, and wherein the first end of the first structural member of the scissor mechanism is pivotably coupled to the fixed support member.

15. The seat support mechanism of claim 14 wherein the mechanical structure further comprises a link that is pivotably coupled to both the fixed support member and the first end of the second structural member of the scissor mechanism.

16. A seat support mechanism that is adapted to constrain motion of a bottom of a seat relative to a floor as the seat bottom moves up and down relative to the floor, where the seat has a seat back, and where the seat is constructed and arranged to support an occupant thereof above the floor, wherein the seat bottom has a front edge, and wherein the seat bottom supports the occupant's thighs with the knees in front of the front edge of the seat bottom, the seat support mechanism comprising:
   mechanical structure that is constructed and arranged such that as the seat bottom is moved up and down, the seat bottom is caused to pivot about a virtual lateral horizontal pivot axis located in front of the front edge of the seat bottom, while the seat back remains at a relatively constant angle to the floor;
   wherein the mechanical structure comprises:
      a seat back support structure that mechanically supports the seat back;
      a scissor mechanism mechanically coupled to the seat back support structure and the floor; wherein the scissor mechanism comprises first and second structural members; wherein the first structural member comprises a first end that is fixed in height relative to the floor and is arranged to pivot about a first pivot axis, and a second end that can move up and down relative to the floor and is indirectly connected to the seat back support structure by a link that is pivotably coupled to both the second end of the first structural member and the seat back support structure; and wherein the second structural member comprises a first end, and a second end that can move up and down relative to the floor and is pivotably coupled to the seat back support structure; and wherein the first and second structural members are pivotably coupled together at a location between their respective first and second ends; and
      a seat bottom support member with a first end that is coupled to the seat bottom at an adjustable angle, and a second end that is coupled to the scissor mechanism.

17. A seat support mechanism that is adapted to, constrain motion of a bottom of a seat relative to a floor as the seat bottom moves up and down relative to the floor, where the seat has a seat back, and where the seat is constructed and arranged to support an occupant thereof above the floor, wherein the seat bottom has a front edge, and wherein the seat bottom supports the occupant's thighs with the knees in front of the front edge of the seat bottom, the seat support mechanism comprising:
   mechanical structure that is constructed and arranged such that as the seat bottom is moved up and down, the seat bottom is caused to pivot about a virtual lateral horizontal pivot axis located in front of the front edge of the seat bottom, while the seat back remains at a relatively constant angle to the floor;
   wherein the mechanical structure comprises:
      a seat back support structure that mechanically supports the seat back;
      a scissor mechanism mechanically coupled to the seat back support structure and the floor; wherein the scissor mechanism comprises first and second structural members; wherein the first structural member comprises a first end that is fixed in height relative to the floor and is arranged to pivot about a first pivot axis, and a second end that can move up and down relative to the floor and is indirectly connected to the seat back support structure by a link that is pivotably coupled to both the second end of the first structural member and the seat back support structure; and wherein the second structural member comprises a first end, and a second end that can move up and down relative to the floor and is pivotably coupled to the seat back support structure; and wherein the first and second structural members are pivotably coupled together at a location between their respective first and second ends;
      a fixed support member that is coupled to the floor, and wherein the first end of the first structural member of the scissor mechanism is pivotably coupled to the fixed support member;
      a link that is pivotably coupled to both the fixed support member and the first end of the second structural member of the scissor mechanism; and
      a seat bottom support member with a first end that is pivotably coupled to the seat bottom at an adjustable angle, and a second end that is pivotably coupled to the scissor mechanism.

* * * * *